July 29, 1924.

L. D. STEPHENSON 1,503,435

HUB AND SPOKE CONNECTION

Filed April 9, 1923

Inventor
Leonard D. Stephenson.

By Arthur L. Slee
Atty.

July 29, 1924.

L. D. STEPHENSON 1,503,435

HUB AND SPOKE CONNECTION

Filed April 9, 1923

Inventor
Leonard D. Stephenson.
By Arthur L. Slee
Atty.

Patented July 29, 1924.

1,503,435

UNITED STATES PATENT OFFICE.

LEONARD DEE STEPHENSON, OF AUBURN, CALIFORNIA.

HUB AND SPOKE CONNECTION.

Application filed April 9, 1923. Serial No. 631,018.

*To all whom it may concern:*

Be it known that I, LEONARD D. STEPHENSON, a citizen of the United States, residing in the city of Auburn, county of Placer, and State of California, have invented a new and useful Improvement in a Hub and Spoke Connection, of which the following is a specification.

My invention relates to improvements in wheel construction for wheels of large diameter which are to be subjected to heavy duty.

My invention is particularly designed for use in connection with logging carts of the type commonly employed for conveying logs from the woods to a mill or loading point. Carts of this type are provided with wheels of very large diameter so that one end of a large log or logs, may be suspended between the wheels to facilitate the dragging of the log by means of tractor, horses or other pulling means in the well known manner.

The wheels of such carts are subjected to extremely hard usage, not only because of the great weight of the logs which is partly supported thereon, but also because of the roughness of the ground and the many obstructions encountered. The extremely heavy loads and the constant jolting imposed upon the ordinary wheel cause the rim and spokes to dish outwardly from the hub and in a comparatively short time cause the wheel to collapse. Furthermore, the frequent breaking of spokes due to contact either with the log being dragged or with outside obstacles such as stumps, etc., necessitates the entire dismantling of the wheel to effect a replacement. In addition to this it is necessary to shrink the tire onto the wheel, which, as is well known, is a process requiring much time and labor. It is thus seen that the life of the ordinary wheel under these conditions is at best very short, and that the wheels must be entirely withdrawn from service for extended periods of time with great frequency to effect necessary repairs.

It is therefore my primary object to provide an improved wheel affording increased strength and durability.

Another object of my invention is to provide a wheel in which the spokes may be readily replaced without dismantling the wheel.

A further object is to provide an improved device by which the spokes may be independently compressed to exert a uniform outward pressure against the rim to maintain the wheel in alignment.

A still further object is to provide an improved wheel of the character described wherein the pressure of the spokes may be adjusted to compensate for expansion and shrinking of the spokes and felloes due to changing atmospheric conditions.

Another object is to provide a construction which will result in greatly strengthening the wheel with only a slight increase in cost, and which will materially reduce the cost of repairs.

I accomplish these and other objects by means of the device disclosed in the drawings forming a part of the present specification wherein like characters of reference are used to designate similar parts throughout said specification and drawings and in which—

Figure 1:
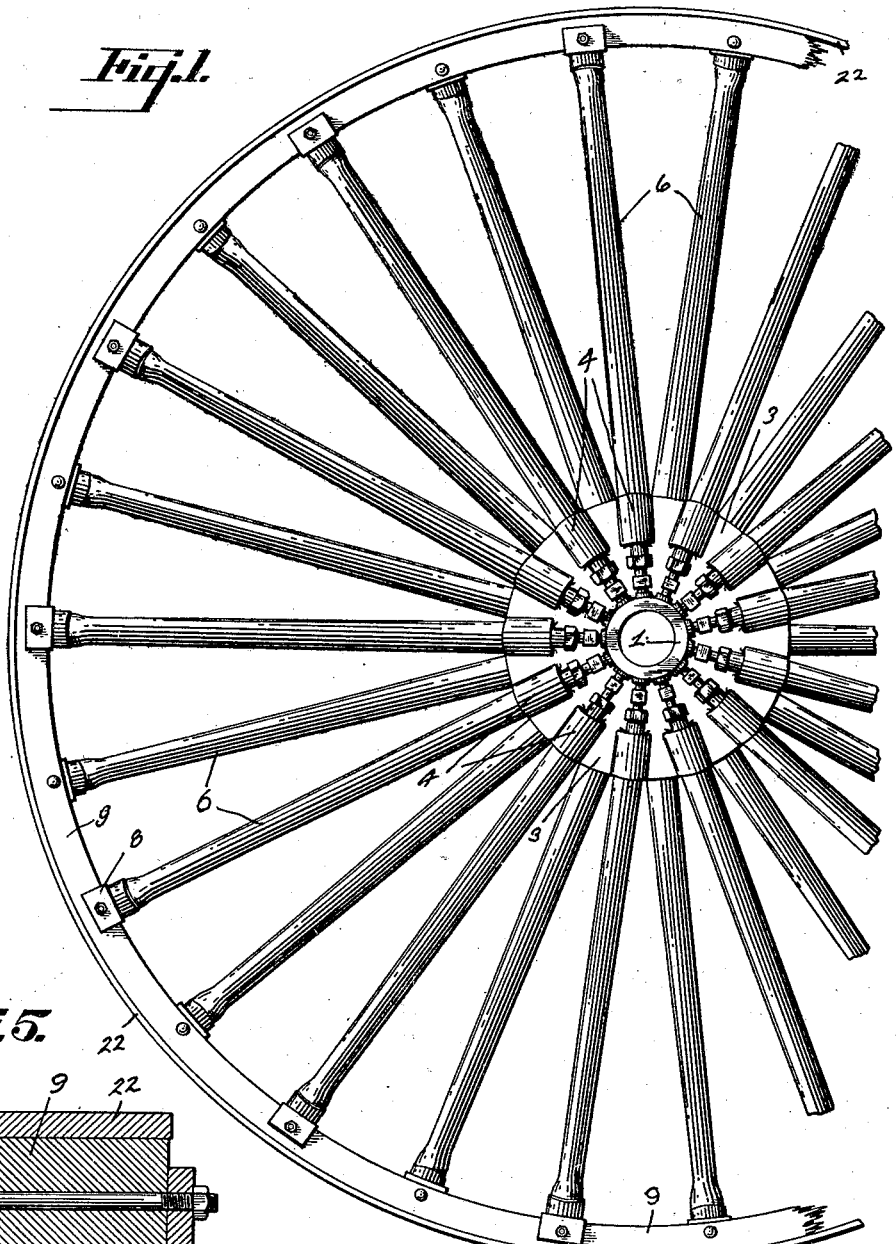
Fig. 1 is a broken side elevation of my improved wheel.
Figure 5:
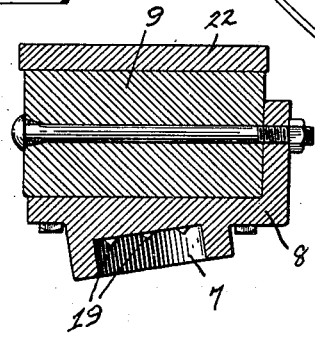
Fig. 5 is an enlarged sectional detail showing the manner in which the spokes are secured upon the rim of the wheel.

Referring to the drawings the numeral 1 is used to designate in general a hub having the usual bearing portion 2 and provided with annular flanges 3 formed adjacent the ends of the hub. A plurality of spoke receiving sockets 4 are formed upon the outer sides of the flanges, 3, to receive the inner ends of spokes 6. The outer ends of the spokes are engaged by spoke receiving recesses 7 formed in plates 8 secured upon the inner side of the felly 9 of the wheel.

Each socket 4 has a reduced opening 11 formed in the inner end thereof to receive a shank 12 formed upon an adjuster 13 slidably mounted within the socket. A rod 14 is threaded into the shank 12 of each adjuster as at 16, said rod being arranged in axial alignment with the socket and adjuster and with the spoke 6 associated therewith and extending inwardly to the hub. The inner end of each rod 14 is rotatably engaged by a recessed lug 16 formed upon the hub to serve as an abutment for the rod. A squared portion 17 is formed upon each rod 14 to receive a wrench or other suitable tool not shown for rotating the rod, and a nut 18 is threaded onto the rod in advance of the adjuster 13 for a purpose hereinafter more fully explained.

The plates 8 are preferably angular in cross section and are secured upon the felly in engagement with the inner side and one edge of the felly from which said rim is formed in any suitable manner. The recesses 7 are formed in lugs cast upon the plate and are of sufficient depth to form a rigid engagement with the ends of the spokes. Spikes 19 are formed in the bottom of the recesses 7 to be pressed into the ends of the spokes to prevent rotation thereof within the recesses.

Figure 2:
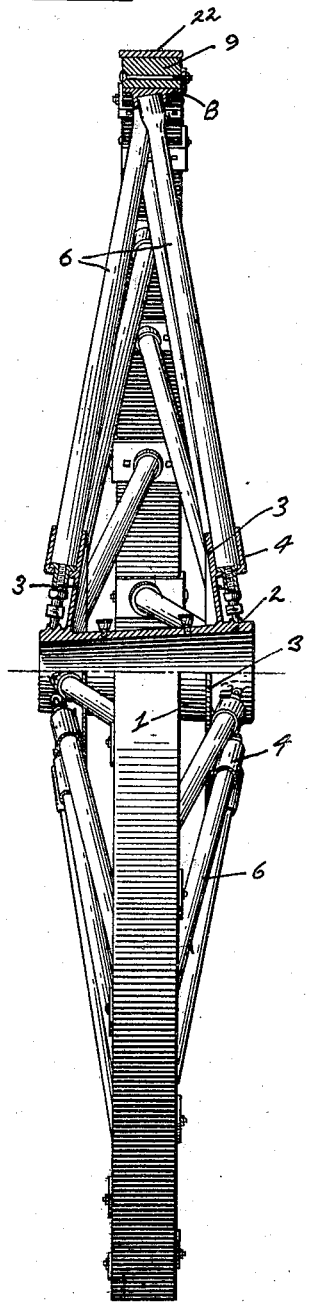
Fig. 2 is a front elevation, partly in section, of the wheel shown in Fig. 1.
Figure 3:
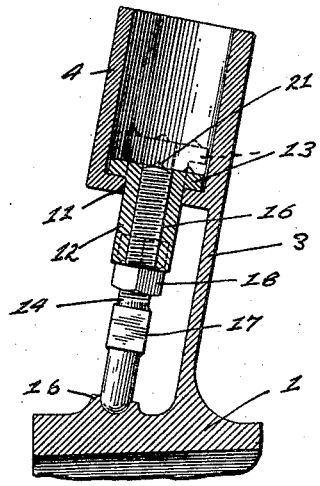
Fig. 3 is an enlarged sectional detail showing the spoke adjusting means.
Figure 4:
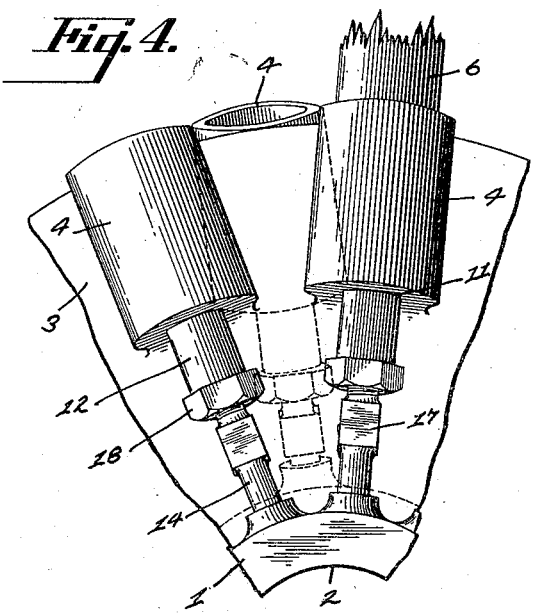
Fig. 4 is an enlarged detail showing a side elevation of a portion of the hub and the spoke adjusting means mounted thereon.

The sockets 4 of the hub 1 are arranged in regularly spaced relation upon each flange 3, the sockets of one flange being arranged midway between the sockets upon the other flange so that alternate spokes 6 of the wheel will be engaged upon opposite flanges. The flanges 3 and sockets 4 and the recesses 7 of the plates 8 are arranged at an angle adapted to align the spokes between the outer sides of the flanges and the approximate center of the felly 9 of the wheel as best shown in Fig. 2 of the drawings.

The spokes 6 being mounted between the sockets 4 and the plates 8 as above described, the rods 14 are rotated in a direction adapted to cause the adjuster 13 to be advanced, by means of the threaded connection with the rods, against the inner ends of the spokes 6, spikes 21 being formed upon the adjusters to engage the spoke and prevent rotation of the adjuster relative of the spoke. As the adjuster is advanced against the spoke, the spoke is pressed outwardly against the rim of the wheel until the desired amount of pressure is created. The nuts 18 are then advanced into firm engagement with the inner ends of the adjusters to serve as checks whereby the adjusters are locked in position. The several adjusters are independently tightened against the spokes to create a uniform outward pressure upon the rim and thereby maintain the wheel in true alignment. The initial tightening of the adjuster against the spokes may of course be changed to increase or decrease the pressure against the rim as the spokes and rim shrink or expand during different seasons of the year under varying atmospheric conditions. Thus during the hot dry weather when the spokes and felloes are caused to shrink, the rods are moved to tighten the spokes against the rim and compensate for the loosening of the spokes which commonly occurs under such conditions.

In event a spoke should be broken, my improved construction makes it possible to make a replacement without dismantling the entire wheel, as the adjuster has only to be receded within the socket to permit the broken spoke to be removed and a new spoke substituted, the adjuster being then moved to tighten the new spoke in position. Such a replacement, it will readily be seen can be effected in a very short time and with very little labor, thereby avoiding the time and expense necessary to remove the tire 22 from the felly, dismount the felloes and insert the new spoke and thereafter again shrink the tire upon the felly as now done with wheels of the type in common usage.

In practice the flanges 3 and sockets 4 are cast integrally with the hub 1 from steel, thirteen sockets being provided upon each flange to accommodate a corresponding number of spokes 6, said spokes being inclined equally from the center of the rim to the ends of the hub. In this manner the strength of the wheel is greatly increased as the inclined relation of the spokes prevents a dishing of the wheel in either direction. By connecting the spokes alternately upon opposite ends of the hub a greater number of spokes can be provided, the wheel being thereby further strengthened.

While I have shown and described what I now consider to be the preferred embodiment of my invention, the details of construction which I have disclosed may of course be modified in many ways. I therefore do not desire to restrict myself to the precise disclosure herein contained but wish to avail myself of all modifications which may fall within the scope of the appended claims:

Having thus described my invention what I claim as new and desire to secure by Letters Patent is—

1. In a wheel having a rim and hub, annular flanges formed adjacent the ends of the hub; sockets formed upon the outer sides of the flanges; spokes connected between said sockets and the rim; adjusting elements slidably mounted within the sockets in engagement with the inner ends of the spokes; and a rod threaded into each adjusting element and bearing against the hub whereby a rotation of the rod will move the adjusting element within the socket to vary the pressure against the spoke.

2. In a wheel having a rim and hub, annular flanges formed adjacent the ends of the hub; sockets formed upon the outer sides of the flanges; spokes connected between said sockets and the rim; adjusting elements slidably mounted within the sockets in engagement with the inner ends of the spokes; and a rod threaded into each adjusting element and bearing against the hub whereby a rotation of the rod will move the adjusting element within the socket to vary the pressure against the spoke; and means formed upon the adjusting elements and engaging the ends of the spokes for preventing rotation of the adjusting element when the rod is rotated.

3. In a wheel having a rim and hub, annular flanges formed adjacent the ends of the hub; sockets formed upon the outer sides of the flanges; spokes connected between said sockets and the rim; adjusting elements slidably mounted within the sockets in engagement with the inner ends of the spokes; and a rod threaded into each adjusting element and bearing against the hub whereby a rotation of the rod will move the adjusting element within the socket to vary the pressure against the spoke; and spikes formed upon the adjusting element to engage the spoke to prevent rotation of the adjusting element relative to the spoke when the rod is rotated.

In witness whereof I hereunto set my signature.

LEONARD DEE STEPHENSON.